United States Patent [19]

Damerow et al.

[11] Patent Number: 5,113,361
[45] Date of Patent: May 12, 1992

[54] SIN/COS GENERATOR IMPLEMENTATION

[75] Inventors: David H. Damerow; William R. Young, both of Palm Bay; Denis W. Faas, West Melbourne, all of Fla.

[73] Assignee: Harris Corporation, Melbourne, Fla.

[21] Appl. No.: 561,821

[22] Filed: Aug. 2, 1990

[51] Int. Cl.⁵ ............................................. G06F 1/02
[52] U.S. Cl. ............................................. 364/721
[58] Field of Search ........................... 364/729, 721

[56] References Cited

U.S. PATENT DOCUMENTS

| | | | |
|---|---|---|---|
| 3,813,528 | 5/1974 | Blanding | 364/721 |
| 4,077,063 | 2/1978 | Lind | 364/729 |
| 4,159,526 | 6/1979 | Mosley, Jr. et al. | 364/721 |
| 4,172,286 | 10/1979 | Wess | 364/721 |
| 4,342,245 | 8/1982 | Gross | 84/1.01 |
| 4,346,448 | 8/1982 | Insam et al. | 364/607 |
| 4,486,846 | 12/1984 | McCallister et al. | 364/607 |
| 4,888,719 | 12/1989 | Yassa | 364/721 |

Primary Examiner—David H. Malzahn
Attorney, Agent, or Firm—Barnes & Thornburg

[57] ABSTRACT

A sin/cos generator which stores values for sin X and cos X, multiplies the sin X and cos X by the value sin Y to produce partial products $-\sin Y \sin X$ and $\sin Y \cos X$ and adds the partial products $\sin Y \cos X$ to $\sin X$ to produce $\sin(X+Y)$ and adds the partial products $-\sin Y \sin X$ to $\cos X$ to produce $\cos(X+Y)$. The values of sin X and cos X are stored for a single quadrant without sign designation and quadrant control is provided to complement the appropriate values of sin X and cos X before adding and multiplying. The complementing forms the one's complement and adds a 1 in the least significant bit to form the two's complement.

28 Claims, 2 Drawing Sheets

SIN/COS GENERATOR IMPLEMENTATION

BACKGROUND AND SUMMARY OF THE INVENTION

The present invention relates generally to function generators and more specifically to an improved sin/cos generator.

To reduce the storage required on an integrated circuit for sin and cos generators, it has been suggested to use the law of signs with a small angle approximation shown in Table 1.

TABLE 1

$$\text{Sin}(X + Y) = \text{Sin } X \text{ Cos } Y + \text{Sin } Y \text{ Cos } X$$
$$\simeq \text{Sin } X + Y \text{ Cos } X$$
$$\text{Cos}(X + Y) = \text{Cos } X \text{ Cos } Y - \text{Sin } X \text{ Sin } Y$$
$$\simeq \text{Cos } X - Y \text{ Sin } X$$

Also the amount of value stored may be reduced by storing only one quadrant of values and complementing the values as illustrated in Table 2.

TABLE 2

| QUADRANT | SIN (X + Y) | COS (X + Y) | SIN EQUATION | COS EQUATION |
|---|---|---|---|---|
| Q1 | Sin (X + Y) | Cos (X + Y) | Sin X + Y Cos X | Cos X − Y Sin X |
| Q2 | Cos (X + Y) | − Sin (X + Y) | Cos X − Y Sin X | − Sin X − Y Cos X |
| Q3 | − Sin (X + Y) | − Cos (X + Y) | − Sin X − Y Cos X | − Cos X + Y Sin X |
| Q4 | − Cos (X + Y) | Sin (X + Y) | − Cos X + Y Sin X | Sin X + Y Cos X |

An implementation of this method is described in U.S. Pat. No. 4,486,846 to McCallister, et al. Four ROMs are provided and include a coarse sin ROM (sin x), a coarse cos ROM (cos X), fine sin ROM (Y sin X) and a fine cos ROM (Y cos X). Adders, multiplexers and control logic are used to combine these values to produce the sin and cos values for the appropriate quadrant. The negative values are produced by parallel inversion with an appropriate bias added. Although this implementation has substantially reduced the amount of the ROM storage required, further improvements in ROM capacity as well as error reduction are needed.

Thus it is an object of the present invention to provide an improved sin and cos generator of reduced ROM capacity and reduced errors.

These and other objects are achieved by storing values for sin X, cos X, and sin Y, multiplying the sin X and cos X by the value sin Y to produce partial products −sin Y sin X and sin Y cos X and adding partial products sin Y cos X to sin X to produce sin(X+Y) and adding the partial-products sin Y sin X to cos X to produce cos(X+Y). The values of sin X and cos X are stored for a sing quadrant without signed designation and quadrant control is provided to invert the appropriate values of sin X and cos X before adding and multiplying. A negative value is formed by generating the one's complement and adding a 1 in the least significant bit.

The multiplier uses a most significant bit portion of the sin X and cos X with sin Y to produce a plurality of partial products. A sin Y value decoder is provided to produce control values for the multiplier, which is a multiplexer, such as complemented, shifted and unshifted values of sin X or cos X and 0. The controls include a shift of 1 as well as a complement using recoding for bit pairs. The decoder is a storage device versus logic. The adder is a Wallace tree which produces sums and carries and a final adder is provided for adding the sum and carries of the Wallace tree. A 1 is also added in the adder in the appropriate bit position for rounding.

A first and second multiplexer each have their inputs connected to the sin and cos storage device and each of their outputs are connected to the multiplier and adder respectively. The multiplier includes first and second multipliers and a respective first and second adder to produce the sin and cos respectively. The first multiplexer has its output connected to the first adder and the second multiplier and the second multiplexer has its output connected to the second adder and the first multiplier. A single value of recoded value of sin Y is provided to both the first and second multipliers. Controllable inversion gates are provided at the output of the first and second multiplexer and the inverted output of the first multiplexer is connected to the input of the second multiplier such that the output of the first multiplexer Provided to the second multiplier is the inverse of the value that the first multiplexer provides to the first adder.

DETAILED DESCRIPTION OF THE DRAWINGS

Figure 1:
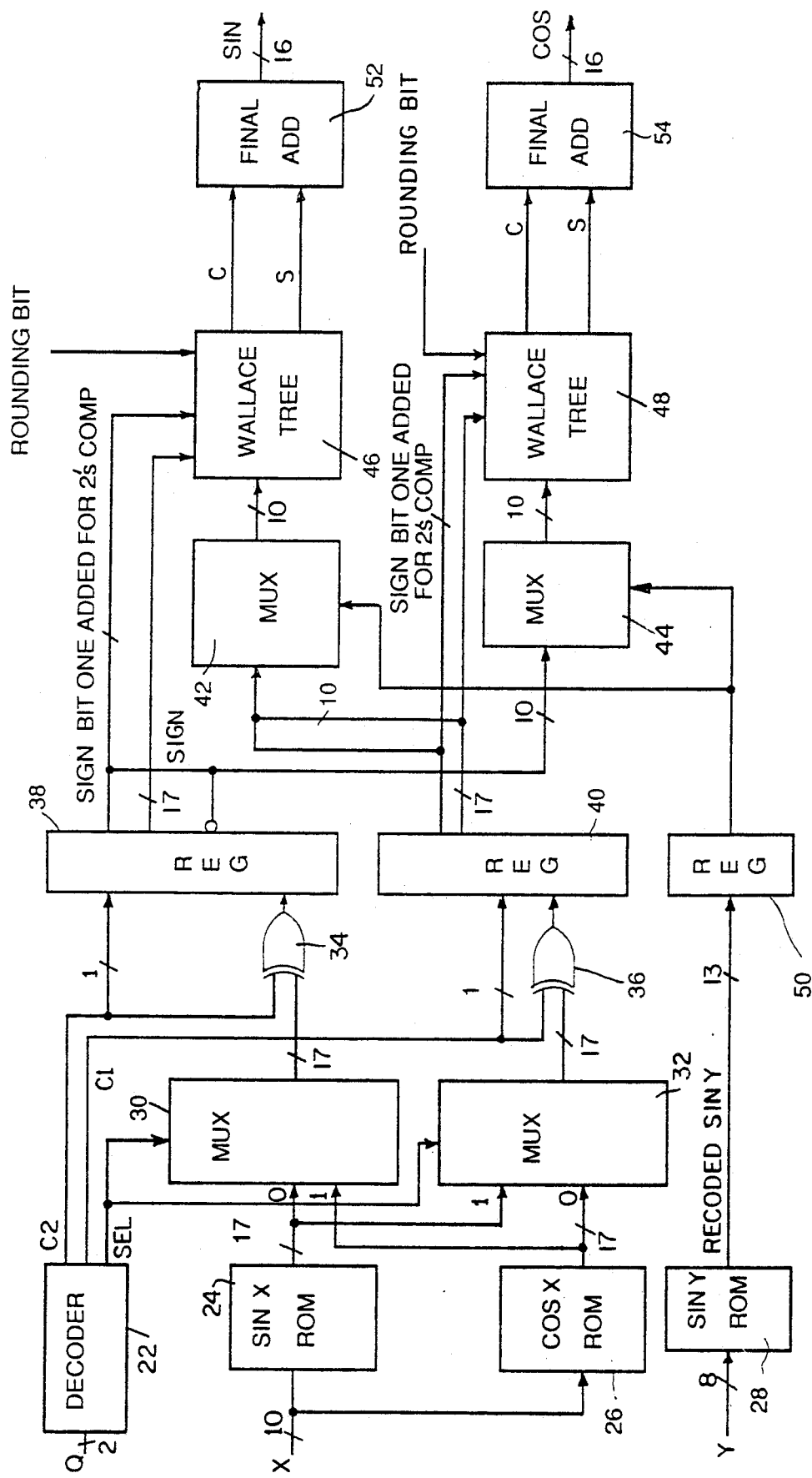
FIG. 1 is a block diagram of a sin/cos generator incorporating the principles of the present invention.

FIG. 1 illustrates a sin/cos generator designed specifically for sixteen bit output. The input is a twenty bit word including two bits for the quadrant Q, ten bits for the phase angle X and eight bits for the smaller phase angle Y. The quadrant Q is decoded by decoder 22 into complement control C1 and C2 and multiplexer select signals SEL as indicated in Table 3.

TABLE 3

| QUADRANT | SEL | C1 | C2 |
|---|---|---|---|
| Q1 | 0 | 0 | 0 |
| Q2 | 1 | 1 | 0 |
| Q3 | 0 | 1 | 1 |
| Q4 | 1 | 0 | 1 |

The ten bits for the angle X are addresses of sin and cos ROMs 24 and 26. The value for the sin and cos are stored in the sin and cos ROMs 24 and 26 as 17 bit words. Alternatively, a single ROM may be used having a 34 bit wide word with the first 0-16 bits being the sin and the last bits 17-33 the cos. Thus a single address will produce both values. These do not include the sign bit since all the sin and cos are stored as positive numbers with their alternate values being controlled by the C1 and C2 control signals and decoder 22. The 17 bit sin and cos values are used to compute 16 bits of precision on the output. The output of the sin X ROM 24 is provided to the zero input of multiplexer 30 and the one input of multiplexer 32. The output of the cos X ROM 26 is provided to the one input of multiplexer 30 and the zero input of multiplexer 32. The select signal SEL from the decoder 22 is connected to multiplexers 30 and 32 such that the output of the multiplexers are the zero or the one input and therefore one will have the sin value as an output and the other will have the cos value as an output.

The output of multiplexers 30 and 32 are connected through gate inverters 34 and 36 to registers 38 and 40 respectively The inverters 34 and 36 are illustrated as exclusive OR gates each receiving an output from respective multiplexer 30, 32 and a complementing control C2 and C1 respectively. The control signal C2 is also provided to the register 38 and control signal C1 is also provided to the register 40 as sign bits.

The 17 bits in register 38 are provided directly to a adder 46, shown as a Wallace tree, to be combined with the sign bit from register 38 as the most significant bit. As we have explained more fully below, the sign bit is also added to the least significant bit. If control bit C2 is 1, the sign bit of 1 is added to the one's complement for forming a two's complement. A rounding bit is also added in an appropriate position in the adder 46. The most significant nine bits of the values in register 38 from the inverted output of register 38 plus the sign bit are provided to multiplexer 44.

Similarly, control signal C1 provides the output of multiplexer 32 directly or as a one's complement to register 40 via exclusive OR gate 36. The 17 bit value of register 40 is provided directly to an adder 48, illustrated as a Wallace tree, to be combined with a sign bit from C1 which is also used to provide an appropriate complement carry for forming two's complement. A rounding bit is also added in the appropriate bit position of the adder 48. The nine most significant bits in register 40 are combined with the sign bit and provided to the multiplexer 42.

Although the adders 46 and 48 are described as Wallace trees, any other adder array may be used.

The eight bits of the angle Y are used as an address in a sin Y ROM 28 which stores recoded values of the sin Y. The addressed recoded sin Y, which is 13 bits, is loaded into a register 50. The output of register 50 is connected to the multiplexer 42 and 44 and act as the control for the multiplexers to produce a plurality of partial products of the recoded sin Y times the sin X and cos X from the registers 38 and 40.

The ROM 28 stores a recoded sin Y value instead of the actual value of sin Y. Employing sin Y instead of Y eliminates one approximation. The cos Y is still considered 1. This results in the modification of Tables 1 and 2 as indicated in Tables 1A and 2A as follows

TABLE 1A

| Sin (X + Y) = Sin X Cos Y + Sin Y Cos X |
|---|
| $\approx$ Sin X + Sin Y Cos X |
| Cos (X + Y) = Cos X Cos Y − Sin X Sin Y |
| $\approx$ Cos X − Sin Y Sin X |

TABLE 2A

| QUADRANT | SIN EQUATION | COS EQUATION |
|---|---|---|
| Q1 | Sin X + Sin Y Cos X | Cos X − Sin Y Sin X |
| Q2 | Cos X − Sin Y Sin X | −Sin X − Sin Y Cos X |
| Q3 | −Sin X − Sin Y Cos X | −Cos X + Sin Y Sin X |
| Q4 | −Cos X + Sin Y Sin X | Sin X + Sin Y Cos X |

As will be discussed more fully below because sin Y is so small, only the upper 10 bits of the partial products are provided to the adders 46 and 48. Also, no complementing carry need be added to the recoded sin Y produced partial product of the one's complement of sin X or cos X, since the complementing carry is out of range.

The output of the adders 46, 48 are the carry signals C and the sum signals S which are provided to final adders 52 and 54 respectively. The output of final adder 52 is a 16 bit sin(X+Y) and the output of final adder 54 is a 16 bit cos(X+Y).

Figure 2:
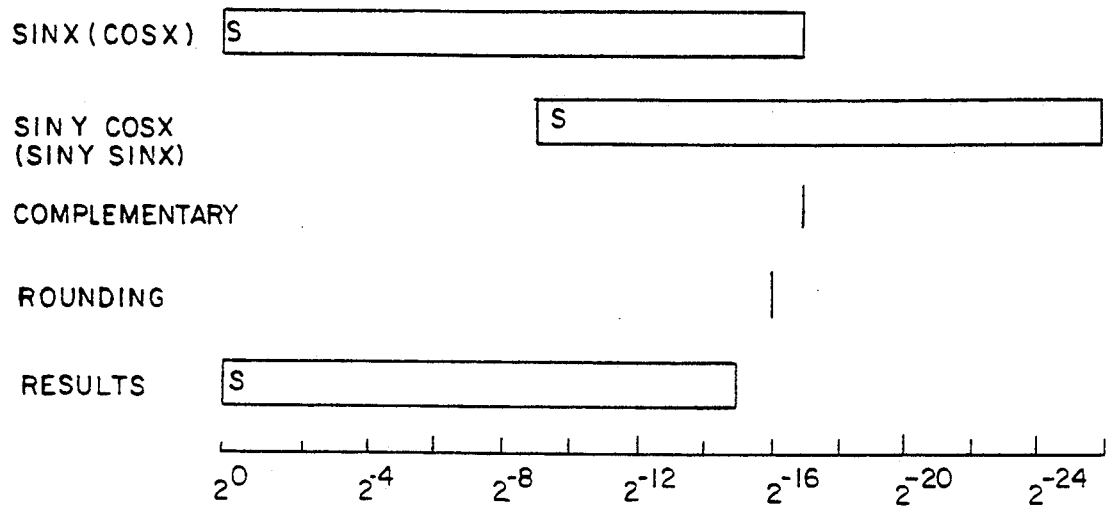
FIG. 2 is diagram illustration the alignment of the various components in the adder array.

The relative positioning of the partial products, sign bit, complement carry and rounding bit within the Wallace tree array is illustrated specifically in FIG. 2, The sin X or cos X is an 18 bit word including 17 bits from the sin X/cos X memory an a sign bit at position $2^0$. The output of multiplexer 42 and 44, being sin Y cos X or sin Y sin X, would also be a 18 bit word including a sign bit. Since the range of the angle Y is one least significant eight of resolution of the angle X, the product of sin Y cos X or sin Y sin X is displaced 9 bits with respect to the maximum value of the sin X or cos X value.

The method of complementing of FIG. 1 forms the one complement by the exclusive OR gates 34 and 36 leading to the registers 38 and 40 and then a 1 is added in the least significant bit or to the $2^{-17}$ bit in the Wallace trees 46 and 48 respectively. By using the Wallace trees 46 and 48, the sin Y cos X and cos Y sin X are provided in the appropriate place and the multiplexer 42 and 44 and Wallace trees 46 and 48 do not have to provide for the storage of the leading zeros.

A rounding compensation 1 is added at the $2^{-16}$ value with the resulting output of the sin and cos being a 16 bit value including sign bit.

With reference to FIG. 1 and table 3, in the first quadrant Q1, the signals SEL. C1 and C2 are all zero. Thus the multiplexers 30 and 32 provide sin X and cos X respectively to the registers 38 and 40 respectively without inversion or one's complementation. Register 38 provides the sin X value to the Wallace tree 46 and the inverse of the sin X value to the multiplexer 44 where it is multiplied by the recoded sin Y value to produce partial products −sin Y sin X to be added in Wallace tree 48. The register 40 provides the cos X directly to the Wallace tree 48 to be combined with the −sin Y sin X and the cos X to multiplexer 42 to be multiplied by sin Y and the partial products to be added to sin X in Wallace tree 46. For quadrant 1 the sign bits in the Wallace trees 46 and 48 are zero and there is no complementing one added. The output of adder 46 and final adder 52 is sin X +sin Y cos X and the output of adder 48 and final adder 54 is cos X−sin Y sin X.

In the second quadrant Q2, SEL=1, C1=1 and C2=0. This causes multiplexers 30 and 32 to select the one input such that multiplexer 30 provides a cos X output and multiplexer 32 provides sin X output. With C1 being a one, the sin X output of multiplexer 32 is inverted by the exclusive OR gate 36 and stored as a one's complement in the register 40. With C2 being zero, the cos X output of the multiplexer 30 is stored without complementation in the register 38. Register 38 provides the cos X directly to the adder 46 and the inverse thereof to the multiplexer 44. The register 40 provides the one's complement of sin X with its one sign bit from the C1 value directly to the adder 48 and to the multiplexer 42. C1 is also provided to the least significant bit in the adder 48 to complete the two's complement. The output of adder 46 and adder 52 is cos X−sin Y sin X and the output of adder 48 and final adder 54 is −sin X−sin Y cos X.

In the third quadrant Q3, the SEL=0, C1=1 and C2=1. Thus multiplexer 30 and 32 provide the sin X and cos X output respectively and both of these values are inverted by exclusive OR gates 34 and 36 and stored as one's complement in registers 38 and 40. Register 38 provides the one complement value of the sin X to the adder 46 and with its sign bit of one and provides the value sin X which is recomplemented at the output to the multiplexer 44. Register 40 provides the one's complemented value of the cos X with its one sign bit to the adder 48 and to the multiplexer 42. Since both sin X and cos X provided directly to the adders 46 and 48 are negative, one's complement carries C1 and C2 are added to the least significant bit in both adder arrays. The output of adder 46 and final adder 52 is −sin X−sin Y cos X and the output of adder 48 and final adder 54 is −cos X+sin Y sin X.

It should also be noted that the inversion of sin X by exclusive OR gate 34 and reinversion at the output of register 38 to be provided to the multiplexer 44 as a positive sin X reduces the complication of complementing since the only one's complementation had been performed twice instead of a full conversion or complementation to the two's complement. Thus the addition of the one carry to the complementation in the adders 46 and 48 rather than at the output of registers 38 and 40 provides improvement in speed as well, as reducing the number elements within the matrix.

In the fourth quadrant Q4, SEL=1, C1=0 and C2=1. Thus the multiplexer 30 provides cos X which is inverted by exclusive OR gate 34 to the register 38. The multiplexer 32 provides sin X to register 40. The inverted cos X is provided from register 38 to the adder 46 and is reinverted and provided to the multiplexer 44. The sin X in register 40 is provided to the adder 48 and to the multiplexer 42. C2 is also provided to the least significant bit in the adder 46 to complete the two's complement. The output of the adder 46 and final adder 52 is −cos X+sin Y sin X and the output of adder 48 and final adder 54 is sin X+sin Y cos X.

The recoded sin Y in register 50 provides control signals to the multiplexers 42 and 44 which function as a multiplier. In binary multiplication, the recoded sin Y is the multiplier and provides appropriate signals to the multiplexers to produce a plurality of partial products. In simplest form, each bit of the recoded sin Y would provide either a zero or a one to the multiplexer which would produce a partial product to be added in Wallace trees arrays 46 48. The partial product would be placed in its appropriate bit position depending upon the bit position of the multiplier.

Alternatively, the size of the arrays 46 and 48 maybe reduced using various methods including a Booth or a modified Booth algorithm for example. This reduces the number of the partial Products by at least half. Preferable the algorithm used is that disclosed in U.S. application Ser. No. 434,790, filed Nov. 13, 1989 for "PLURAL BIT RECODING MULTIPLIER" by W. R. Young and C. W. Malinowski. That application is incorporated herein by reference. The recoded sin Y is the multiplier sin Y recorded into appropriate control signals of plural bits. Using the two bit coding algorithm of the Young/Malinowski application, the control signals for the multiplexer 44 would be zero, 1, shift 1 and −1. The control signal negative 1 provides the one's complement at the output of the multiplexer. No complementing carry is provided for the preceding one's complement in the Wallace tree since it is well out of range. The multiplexers 42 and 44 include the appropriate logic to produce sign extension using the sign of sin X and cos X and the recoded sin Y.

Since the range and values of sin Y are known, the sin Y ROM 28, instead of storing the sin Y, would store the multiplexer control signals depending upon the algorithm used. This will reduce the amount of logic needed to recode the Sin Y to multiplexer controls.

It should be noted that the registers 38, 40 and 50 are used to provided pipelining to keep the throughput high, for example at 40 MHz. To eliminate the output of +1, which would require an extra output bit, the sin X and cos X values can be scaled in the ROM generation, for example by:

$$\frac{2^{16} - 1}{2^{16} + 1}$$

Figure 3:
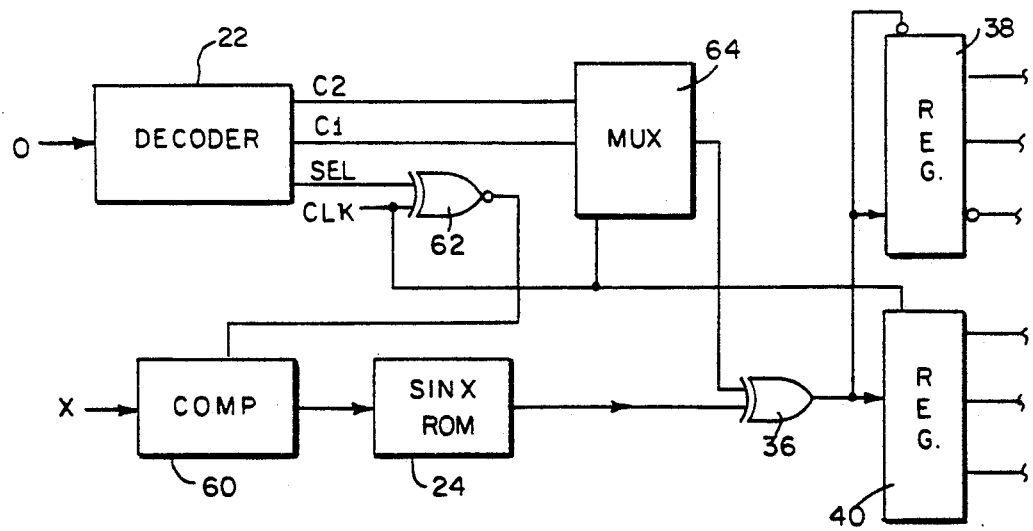
FIG. 3 is a block diagram of a variation of the sin/cos generator of FIG. 1 using a single sin/cos store.

To further reduce the amount of ROM required, sin X and cox X can be obtained from the same ROM. This would require two accesses. A single quadrant of sin can be stored and addressed by X for sin X and the complement of X for cos X. A modification to the circuitry of FIG. 1 providing values to the registers 38 and 40 is illustrated in FIG. 3.

The value X is provided to a controllable complementer 60 whose output is connected to ROM 24. The output of ROM 24 is connected through gate inverter 36 to registers 38 and 40. The select output SEL of the decoder 22 is connected to the complementer 60 by an exclusive NOR gate 62 whose other input is the clock signal CLK. During the first half cycle when CLK is 1 and SEL is 0, the complementer 60 is disabled and therefore provides the value X directly to address the ROM 24, which outputs sin X During the second half cycle when CLK is 0 and SEL is 0, the complementer 60 Provides the complement X to address the ROM 24 which outputs the cos X. For SEL of 1, the complementer 60 provides the complement of X to address the cos X in the first half cycle and X to address the sin X in the second half cycle. To simplify the complementer 60, it could be a one's complementer using an exclusive OR gate. The ½ the least significant bit.

The complement control outputs C1 and C2 of the decoder 22 are connected to the inverter 36 by multiplexer 64 which is controlled by the clock CLK 62. During the first half cycle when CLK is 1, the multiplexer 30 provides C2 to the inverter 36 and during the second half cycle when CLK is 0, the multiplexer 30 provides C1 to the inverter 36. The clock signal CLK is connected to the clock input of the register 40 and the inverse clock input of register 38 Thus on the 1 to 0 transition between the first and second half cycles, register 38 is loaded from the inverter 36 and on the 0 to 1 transition between the second and first half cycles, register 40 is loaded from the inverter 36.

While the SEL signal controls the addressing order of the sin and cos, the C1 and C2 control the inversion of the sin X and cos X. For the first and third quadrant when select SEL is zero, ±sin X output of ROM 24 is provided to register 38 during the first half cycle and ±cos X to register 40 during the second half cycle. For the second and fourth quadrants when select SEL is one, the ±sin X output of ROM 24 is provided to register 40 during the first half cycle and ±cos X to register 38 during the second half cycle. The remainder of the circuitry of FIG. 1 will operate as previously described.

Although FIG. 1 shows the parallel generation of sin(X+Y) and cos(X+Y) using two multipliers, the same principles could be used to generate sin(X+Y) and cox(X+Y) serially. This would eliminate multiplexer 44, Wallace tree 48 and final adder 54. The control signals to multiplexers 30 and 32 exclusive OR's 34 and 36 would be changed to produce the appropriate results of Table 2A.

As an even further alternative not illustrated, the registers 38 C and 40 may be replaced with two additional exclusive NOR gates 34' and 36' connected to respective multiplexers 30 and 32. These exclusive NOR gates 34' and 36' provide the complement value of the outputs of exclusive OR gates 34 and 36 with no additional time penalty. The output of exclusive OR gates 34 and 36 and exclusive NOR gate 34' and 36' are connected directly to Wallace trees 46 and 48 respectively, and are connected to multiplexers 44 and 42 respectively.

Errors due to rounding truncation are described in Table 4.

TABLE 4

| | |
|---|---|
| sin X, cos X (rounding into table) | $\leq 2^{-18}$ |
| sin Y (rounding into table) | $\leq 2^{-18}$ |
| cos X, sin X (truncation to 10 bits) | $\leq 2^{-18}$ |
| Final rounding | $\leq 2^{-16}$ |

Simulations show that the peak error in the sin(X+Y) and cos(X+Y) to be equal to $-92.6$ db and the magnitude of the error vector to be a maximum of $-90.2$ db wherein the error vector is $$\text{error vector} = \frac{\sqrt{(\text{error of sin}(X+Y))^2 + (\text{error of cos}(X+Y))^2}}{\sqrt{(\sin(X+Y))^2 + (\cos(X+Y))^2}}$$

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A function generator for generating generally sinusoidal shaped signals in accordance with the equations:

$$\sin(X+Y) = \sin X + \sin Y \cos X$$

$$\cos(X+Y) = \cos X - \sin Y \sin X$$

comprising:
first sin storage means for storing values of sin X;
cos storage means for storing values of cos X;
second sin storage means for storing values of sin Y
multiplying means for receiving sin X and sin Y from said first and second sin storage means and cos X from said cos storage means and for producing products $-\sin Y \sin X$ and sin Y cos X; and
adder means for adding said products sin Y cos X to sin x and adding said products $-\sin Y \sin X$ to cos X to produce sin (X+Y) and cos (X+Y).

2. A function generator according to claim 1 wherein said sin X and cos X each have N bits and said multiplying means uses the M most significant bits of sin X and cos X, wherein M is less than N.

3. A function generator according to claim 2 wherein M is substantially less than N.

4. A function generator according to claim 2 wherein the output of the adder means has N+P bits and said adder means includes rounding means for adding a one to form said sin (X+Y) or cos (X+Y) for rounding errors.

5. A function generator according to claim 4 wherein said first and second sin storage means and cos strange means store sin X and cos X respectively as N-1 bits without a sign bit.

6. A function generator according to claim 1 wherein said multiplying means includes complementing means between said first sin and cos storage means and said adder means for forming a complement of said sin X and cos X.

7. A function generator according to claim 6 wherein said first sin and cos storage means stores a single quadrant of sin X and cos X respectively; and
including quadrant means for receiving a quadrant signal, and for controlling said multiplying means and said complementing means as a function of said quadrant signal.

8. A function generator according to claim 7 wherein said first sin and cos storage means stores said sin X and cos X, respectively, without a sign bit; and said quadrant means provides a sign bit to said adder means at the most significant bit as a function of said quadrant signal.

9. A function generator according to claim 8 wherein said complementing means forms a one's complement and said adder means includes means for adding said sign bit of one to the least significant bit of a one's complement of sin X and cos X.

10. A function generator according to claim 1 wherein said first sin and cos storage means store a single quadrant of sin X and cos X, respectively, without a sign bit; and
including quadrant means for receiving a quadrant signal, controlling said multiplying means as a function of said quadrant signal, and providing a sign bit to said adder means at a most significant bit as a function of said quadrant signal.

11. A function generator according to claim 10 wherein said multiplying means includes complementing means for forming a one's complement of sin X and cos X under control of said quadrant means and wherein said sign bit is also added to a least significant bit in said adder means to form a two's complement.

12. A function generator according to claim 1 wherein said multiplying means includes:
first multiplexer means having inputs connected to said first sin and cos storage means and an output connected to said adder means;
second multiplexer means having inputs connected to said first sin and cos storage means and an output connected to said multiplying means; and
control means for controlling said first and second multiplexer means.

13. A function generator according to claim 12 including a complementing means between said first and second multiplexer means and said multiplying and adder means for forming a complement of said sin X and cos X.

14. A function generator according to claim 13 wherein said first sin and cos storage means store a single quadrant of said sin X and cos X respectively; and
said control means includes quadrant means for receiving a quadrant signal and controlling said first and second multiplexer means and said complementing means as a function of said quadrant signal.

15. A function generator according to claim 1, wherein said multiplying means includes:
   recoding means for recoding sin Y into MUX control signals; and
   a multiplexer means for receiving sin X and cos X and producing a plurality of partial products as shifted and unshifted values of sin X and cos X and zero in response to said MUX control signals.

16. A function generator according to 15 wherein said recoding means recodes sin Y into MUX control signals zero, non shift, shift one, and complement for bit pairs.

17. A function generator according to claim 15 wherein said recoding means is said second sin storage means for storing said MUX control signals as a function of recoded sin Y addressed by Y.

18. A function generator according to claim 15 wherein said adder means includes a Wallace tree producing sums and carries and a final adder for adding said sums and carries to produce sin $(X+Y)$ and cos $(X+Y)$.

19. A function generator according to claim 15 wherein:
   said multiplexer means includes a first and second multiplexer means;
   said adder means includes first and second adder means receiving inputs from said first and second multiplexer means respectively and providing sin $(X+Y)$ and cos $(X+Y)$ output respectively; and
   said recoding means providing common MUX control signals to said to said first and second multiplexer means.

20. A function generator according to claim 1 wherein said multiplying means includes a first and second multiplying means;
   wherein said adder means includes first and second adder means for receiving inputs from said first and second multiplying means respectively and providing sin $(X+Y)$ and cos $(X+Y)$ outputs respectively;
   wherein said multiplying means includes first multiplexer means having inputs connected to said first sin and cos storage means and an output connected to an input of said second multiplying means and a input of said first adder means;
   wherein said multiplying means includes said second multiplexer means inputs connected to said first sin and cos storage means and an output connected to an input of said first multiplying means and an input of said second adder means; and
   wherein said multiplying means includes control means for controlling said first and second multiplexer means.

21. A function generator according to claim 20 wherein said multiplying means includes a complementing means between said first and second multiplexer means and said first and second multiplying means and first and second adder means for forming a complement of said sin X and cos X.

22. A function generator according to claim 21 wherein said first sin and cos storage means store a single quadrant said sin X and cos X respectively; and
   said control means includes quadrant means for receiving a quadrant signal and controlling said first and second multiplexer means and said complementing means as a function of said quadrant signal.

23. A function generator according to claim 21 wherein said complementing means includes:
   a first and second complementing means connected to the output of said first and second multiplexer means and being controlled by said control means; and
   third complementing means connected between said first complementing means and one of said second multiplying means and first adding means for always complementing.

24. A function generator according to claim 23 wherein said first, second and third complementing means forms a one's complement and said first and second adder means include means for adding one to the least significant bit of a complemented sin X or cos X.

25. A function generator according to claim 1 wherein:
   said second sin storage means stores sin Y as recoded sin Y as MUX control signals; and
   said multiplying means includes a multiplexer means for receiving sin X and cos X and producing a plurality of partial products as shifted and unshifted values of sin X and cos X and zero in response to said MUX control signals.

26. A function generator according to claim 1 wherein said second sin storage means stores values of sin Y as Y.

27. A function generator according to claim 1 wherein said first sin and cos storage means include:
   a common sin storage means for storing a single quadrant of sin X values; and
   input complementing means for complementing X to address sin X values in said common sin storage means for cos X.

28. A function generator according to claim 1 wherein said first sin and cos storage means include:
   a common storage means for storing a single quadrant of sin X and cos X values as a single word for each X.

* * * * *